United States Patent [19]
Schroer et al.

[11] 3,943,252
[45] Mar. 9, 1976

[54] POLYURETHANE CASEIN COATING COMPOSITION

[75] Inventors: Walter Schroer; Helmut Reiff, both of Cologne; Dieter Dieterich, Leverkusen; Karl Berger, Opladen, all of Germany

[73] Assignee: Bayer Aktiengesellschaft, Leverkusen, Germany

[22] Filed: Feb. 25, 1974

[21] Appl. No.: 445,704

Related U.S. Application Data

[63] Continuation of Ser. No. 285,708, Sept. 1, 1971, abandoned.

[30] Foreign Application Priority Data
Sept. 8, 1971   Germany........................... 2144878

[52] U.S. Cl. .................... 428/262; 260/6; 260/7.5; 427/390; 428/473
[51] Int. Cl.$^2$. B32B 27/40; B32B 9/04; C08L 89/02
[58] Field of Search ........... 260/6, 7.5; 161/88, 226; 117/142

[56] References Cited
UNITED STATES PATENTS

| | | | |
|---|---|---|---|
| 3,461,103 | 8/1969 | Keberle et al. .......................... | 260/6 |
| 3,479,310 | 11/1969 | Dieterich et al. .................. | 260/29.2 |
| 3,491,050 | 1/1970 | Kerberle et al. ........................ | 260/6 |

OTHER PUBLICATIONS

Chem. Absts., Vol. 69:3733b, (1968) "Leather Finishing Solutions," Farbwerke Hoechst.
Chem. Absts., Vol. 72:4349e, (1970) "Modified Casein—Leather Finishing," Toshev et al.
Chem. Absts., Vol. 72:4348d, (1970) "Effect—Leathers," Titov et al.
Chem. Abstr., Vol. 68:4028s, (1968) "Crosslinked Polyurethanes—Coating—Materials," Heydkamp et al.
Chem. Absts., Vol. 68:70188v, "The Penetration—Casein—Leather—Fatliquor," Landmann.

*Primary Examiner*—Howard E. Schain
*Assistant Examiner*—Edward Woodberry
*Attorney, Agent, or Firm*—Lawrence S. Pope; Gene Harsh

[57] ABSTRACT

Compositions suitable for coating leather or textile materials are provided which compositions are the reaction product of (a) solubilized casein (b) water-dispersible polyurethane and (c) formaldehyde.

10 Claims, No Drawings

POLYURETHANE CASEIN COATING COMPOSITION

This invention relates to coating compositions and more particularly to coating compositions suitable for application to leather and textile materials, and is a continuation-in-part of co-pending application Ser. No. 285,708 filed Sept. 1, 1972 now abandoned.

Aqueous polyurethane dispersions have been used heretofore as coating materials for textiles and leather. When employed, for example, in leather-dressing applications, polyurethane dispersions form coatings which are slow drying, have poor dry rub resistance and have a somewhat unnatural, rubber-like appearance and handle.

Leather dressing coatings based on plasticized casein and formaldehyde have also been used, however, such coatings have a very low crease resistance and poor wet-rub resistance. The use of plasticized casein/formaldehyde dressings have a tendency to harden the leather and the dressing or coating has a tendency to crack thus damaging the grain structure of the leather.

Coatings obtained using polymer or copolymer binders, based, for example, on polyacrylate or acrylic-butadiene-styrene have poor adhesive properties and solvent resistance. Moreover, leathers dressed with such copolymer dispersions have poor hot rub resistance and shear resistance and poor fastness to hot ironing.

It is therefore an object of this invention to provide leather and textile coating compositions devoid of the foregoing disadvantages. It is a further object of this invention to provide coating compositions particularly suited for leather dressing applications. An additional object of this invention is to provide coating compositions which are relatively simple to apply by for example, knife coating, casting, ooze coating or spray coating. Another object of this invention is to provide leather and textile coating compositions, which coatings have excellent dryrub resistance, good grain structure, soft handle, good adhesion, low swellability in water, excellent solvent resistance, high crease resistance and good fastness to light. It is a further object of this invention to provide coated leather and textile materials.

According to U.S. Pat. No. 3,479,310 casein may be added to polyurethane dispersions as a protective colloid. That means for everyone skilled in the art that about 1 to 6% by weight (based on solids content) may be used.

Finishes for leather based on a polyurethane dispersion containing about 1 to 6% by weight of the protective colloid casein have a good fastness to wet rubbing; their dry rub fastness, however, is very bad and they have an unpleasant draggy and tacky handle. (The dry rub fastness may be measured according to Satra in Journal Society of Leather Trade's Chemists 41 (1957), page 120). If the base coats are rubbed against one another, there is a very strong blocking effect. Thus, in the manufacture of leather where the base coated products usually are stored grain side to grain side between the various finishing steps, pulling down the leather from the pile would be strongly hindered by blocking; the prime coat even could be damaged by sticking together of the sheetings or by scouring. Fastness properties and tackiness do not alter very much in this case, however, if formaldehyde is added to the aqueous liquor.

The foregoing objects and others which will become apparent from the following description are accomplished in accordance with the invention, generally speaking, by providing a composition comprising the reaction product of (a) at least 10% by weight of solubilized casein (based on polyurethane solids) (b) polyurethanes which can be dispersed in water and (c) formaldehyde.

Thus, it is possible to avoid the aforesaid disadvantages by increasing the concentration of solubilized casein well above the amount of a protective colloid. The higher the content of casein in the base coat, however, the more pronounced its hydrophilic properties. Owing to the increased capability of swelling in water, the wet rub fastness is decreased markedly. These difficulties are overcome, however, if according to the invention both formaldehyde and more than about 10% by weight of solubilized casein (based on polyurethane solids) are added to the polyurethane dispersion. The dry rub fastness is increased and the blocking effect is so slight that the leather can be easily pulled down from a pile during manufacture.

A further increase to dry rub fastness and a further improved dry handle of the leather (without any deleterious effect on wet rub fastness) may be achieved by adding still more solubilized casein; i.e., preferably at least 14% by weight and most preferably at least 17% by weight solubilized casein based on polyurethane solids.

Resistance to hot ironing and behavior during lasting with hot clamps are also improved considerably when the leather is finished with coatings according to the invention.

The solubilized casein employed in the manufacture of the coating composition of the invention is to be understood as the commercially available casein which has been treated that is to say rendered water-soluble, with either acids or bases. The manufacture of solubilized casein is well known and described, for example, in W. Grassmann, Handbuch der Gerbereichemie und Lederfabrikation (handbook of Tannery Chemistry and Leather Manufacture) I/part 1, page 724 and thereafter, 2nd edition (1961). Instead of acid-treated casein, it is also possible to use casein modified by alkoxylation. The manufacture of an alkoxylated casein is described, for example, in German Patent Specification 574,841.

In manufacturing the reaction products to be used according to the invention care must be taken that acid-treated casein should be reacted with non-ionically emulsified polyurethanes or with cationic or cationically emulsified polyurethanes whereas base-treated casein should be reacted with non-ionically emulsified polyurethanes or with anionic or anionically emulsified polyurethanes. The casein solutions may contain customary casein plasticizers such as, for example, glycols, polyols, polyetherglycols, turkey red oils and the like.

By the water-dispersible polyurethanes to be employed for the manufacture of the reaction products to be used according to the invention these are to be understood as the known polyurethanes, and in particular both (A) the non-ionic polyurethanes which can be dispersed in water by means of conventional emulsifiers and high shear mixing, and (B) the so-called self-dispersible polyurethanes which contain ionic groups.

The polyurethanes of type (A) or their aqueous dispersions are prepared from prepolymers containing isocyanate groups and chain lengthening agents which are dissolved in water, such as for example, primary or secondary amines, in the presence of emulsifiers and using high shear mixing. The manufacture of such polyurethanes or of their aqueous dispersions is described, for example, in British Patent 791,851 and U.S. Pat. Nos. 3,148,173; 3,294,724 and 3,410,817.

The preparation of the polyurethanes of the type (B) or of their aqueous dispersions may be effected, for example, by dissolving prepolymers in organic solvents, such as for example, acetone, and dispersing these solutions in water after addition of chain lengthening agents carrying ionic groups or groups which can be converted into such. Since these systems are selfemulsifying, no emulsifiers and only low shear forces are required. After distilling off the solvent, the aqueous polyurethane dispersions remain.

The preparation of these polyurethanes or of their aqueous dispersions is described, for example, in German Pat. Nos. 1,178,586 and 1,237,306 U.S. Pat. No. 3,479,310 and British Pat. No. 1,076,688.

In the preparation of the coating compositions of the invention, the water-dispersible polyurethanes are preferably employed in the form of their aqueous dispersions.

The formaldehyde used according to the invention may be employed as monomeric formaldehyde in the gaseous state or in aqueous solution, for example, as a 10% or 30% by weight formaldehyde solution. Polymeric formaldehyde in an anhydrous form such as, for example, paraformaldehyde or trioxane are also suitable. Instead of formaldehyde, equivalent amounts of compounds which split off formaldehyde can also be used. Examples of such compounds which split off formaldehyde are trioxane, methylal, hexamethylenetetramine, oligo-methylol compounds, such as, dimethylolurea, hexamethylolmelamine, tetramethylolacetone and hexamethylolacetone. Methylolethers may also be employed if they are used together with acid catalysts and hence are present partly as free methylol compounds or free formaldehyde. Such methylolethers are, for example, urea-methylol-ether and hexamethylolmelamine-methyl-ether. In general, however, the use of aqueous formaldehyde solutions is preferred.

The reaction of the starting materials (a), (b) and (c) is preferably effected by bringing the components together, applying the reaction mixture to the substrates, and heating it to from about 40° to about 140°C, preferably from about 60°C to about 90°C until the water has evaporated. In particular, in the case of direct coating the crosslinking reaction takes place directly on the leather or the textile material. If, conversely, coating is carried out by the transfer method, the reaction takes place on a support, for example, release paper, release film, a steel matrix or matrices of siliconized rubber, in which case the leather or textile can still be laid, pressed or ironed on before completion of the reaction and the coated material can be separated from the carrier, again after brief warming within the range of temperatures stated hereinabove. Particularly welladhering coatings are obtained if the coating mixtures are applied to the substrates to be coated before completion of the crosslinking reaction. The coatings then adhere so well that an additional coating of adhesive is superfluous.

It has proved particularly advantageous to employ reaction products of (b) and (c) instead of using the compenents (b) and (c) separately. These reaction products and their manufacture are described for example, in Bristish Pat. No. 1,244,701. They are obtained, for example, by reacting prepolymers carrying ionic groups or groups convertible into such, firstly with urea or its derivatives capable of reacting with formaldehyde and isocyanate groups, and subsequently with formaldehyde or compounds which split off formaldehyde. The reaction with formaldehyde is carried out before, during or after the dispersion of the prepolymer-urea reaction product.

In the manufacture of the compositions to be used according to the invention it has proved advantageous to employ the components (a), (b) and (c) in such amounts that from about 10 to about 1,000 preferably from about 20 to about 700 and most preferably, from about 50 to about 600 parts by weight of water-dispersible polyurethane and from about 1 to about 60, preferably from about 5 to about 50 parts by weight of formaldehyde are present per 100 parts by weight of solubilized casein solids. The total water content of the coating compositions may vary within wide limits, e.g. between about 65% by weight and 98% by weight. Preferred is a water content of about 75% to 95% by weight.

The compositions of the invention are suitable for coating textile materials of natural fibers, for example, cotton, or of synthetic fibers, such as synthetic polyamides, polyesters and polyacrylonitrile and have proved particularly suitable for coating leather. The reaction products to be used according to the invention may be used both as a bottom or as a top coat, and also as a final finish. As a bottom, softer combinations are employed whereas as a final finish harder combinations are employed. The hardness can be influenced both by increasing the amount of casein and by using harder polyurethanes. The levelling during application can be improved, if necessary, by adding customary solvents, such as esters, ketones and alcohols.

The reaction products of the invention may be blended with customary polymers, for example, polyethylenes, polypropylenes, polyvinyl acetates, ethylene vinyl acetate copolymers, ethylene copolymers and styrene-butadiene-acrylonitrile copolymers in order to achieve special properties or to provide less expensive coatings. Inactive fillers, such as carbon black, silica, talc, kaolin, titanium dioxide and the like may also be used conjointly.

The invention is further illustrated but is not intended to be limited by the following examples wherein all parts and percentages are by weight, unless otherwise indicated.

EXAMPLE 1

A primer mixture of about 100 parts of a commercially available 10% casein solution obtained by treatment of casein with ammonia, and additionally containing pigment and customary casein plasticizers as mentioned above, about 150 parts of the 40% strength aqueous anionic emulsifier-free polyurethane dispersion I described below, about 300 parts of a 10% strength formaldehyde solution and about 450 parts of water is applied by repeated spraying or oozing, onto a Nappa cowhide which has been chrome-tanned and pre-dyed with an aniline dyestuff, the leather being dried for about 3 minutes at 40°C. between each application.

A primed leather is obtained which displays a pleasant dry and nevertheless soft and supple handle.

The amount of the coating composition being applicated to the substrate depends on the quality of the leather. One application of about 15 g/square foot may be sufficient for leather of high quality; five or more applications of about 20 g/square foot, however, may be necessary, if the leather has worse quality.

Compared to the bottom obtained in accordance with Deutsche Auslegeschrift (German Published Specification) 1,278,064, the bottom according to the invention is distinguished by substantially increased dry rub resistance and resistance to rubbing with solvents, while having the same crease resistance. Furthermore, the leather dressed in accordance with the invention shows better sealing, somewhat higher gloss, better resistance to hot ironing and better adhesion.

The bottomed leather is given a final finish both with commercially available finishes based on casein or nitrocellulose, such as described by W. Grassmann, Handbuch der Gerbereichemie und Lederfabrikation, (Handbook of Tannery Chemistry and Leather Manufacture), volume III/I, page 889 for casein and page 892 for nitrocellulose, and with commercially available polyurethane lacquers which are applied either as reactive two-component lacquers or as reactive one-component lacquers. The level of fastness of the bottom according to the invention remains distinctly superior to a normal, hitherto customary leather bottom, independently of the final finish.

The 40% strength aqueous anionic emulsifier-free polyurethane dispersion I employed is prepared as follows:

A pre-adduct obtained from 218.5 parts of adipic acid hexanediol/neopentylglycol polyester (OH number: 63) and 55 parts of 1,6-hexanediisocyanate is taken up in 1000 parts by volume of acetone (water content: 0.18%) and treated, at about 55°C, with a mixture of 7.5 parts of ethylenediamine, 15.3 parts of 1,3-propanesultone and 12.6 parts of triethylamine in 40 parts by volume of water. After adding 350 parts by volume of water the acetone is distilled off in vacuo. A 36.6% colloidal solution having a pH-value of about 6 is obtained.

An equivalent bottom is also obtained if instead of the 150 parts of the polyurethane dispersion I employed above 160 parts of the polyurethane dispersion II, about 130 parts of the polyurethane dispersion III or 150 parts of the polyurethane dispersion IV are used.

Polyurethane Dispersion II

To manufacture the pre-adduct, 218.5 parts of adipic acid hexanediol/neopentylglycol polyester (OH number: 63) and 30.6 parts of 1,6-hexanediisocyanate are stirred for about 2 hours at about 120°C. After cooling, the melt is taken up in acetone and 32.2 parts of an aqueous 20% sodium taurine solution are added. After adding about 320 parts by volume of water and distilling off the acetone, a latex having a solids content of 39% and a pH-value of about 6 to 7 is obtained. The content of sulphonate groups in the polyurethane is 1.37%.

Polyurethane Dispersion III:

250 parts of a polypropylene glycol ether (OH number: 56) are stirred for 2 hours at about 120°C with 126.2 parts of toluylenediisocyanate (isomer mixture of 65% 2,4-isomer and 35% 2,6-isomer). After cooling to about 70°C, a solution of 52 parts of neopentylglycol in 100 parts by volume of acetone is added to the mixture. The mixture is warmed to about 60°C for 5 hours. 800 parts by volume of acetone are added. After addition of a mixture of 50 parts by volume of water, about 3.6 parts of ethylenediamine, 7.63 parts of 1,3-propanesultone and 25 parts by volume of 10% aqueous sodium hydroxide solution, 450 parts by volume of water are stirred into the mixture. After distilling off the acetone, a stable dispersion having a solids content of 47% is obtained.

Polyurethane Dispersion IV:

The polyurethane dispersion is obtained in the same manner as the polyurethane dispersion I, except for the difference that the acetone solution of the prepolymer is reacted with a mixture of 7.5 parts of ethylenediamine, 15.3 parts of 1,3-propanesultone and 70 parts by volume of 10% potassium hydroxide solution in 50 parts by volume of water. After adding 480 parts by volume of water and distilling off the acetone, a 36.8% strength latex having a pH-value of about 6 to 7 is obtained.

EXAMPLE 2

The leather bottomed in accordance with Example 1, instead of being provided with a customary top finish based on casein, as described in W. Grassmann, Handbuch der Gerbereichemie und Lederfabrikation (Handbook of Tannery Chemistry and Leather Manufacture), volume III/I, page 889, is provided with the following top coat: 150 parts of a 15% casein solution obtained by solubilization of casein with monoethanolamine and additionally containing 8% of the customary plasticizers as mentioned above, 150 parts of the aqueous methylolated polyurethane dispersion I described below, 300 parts of a 10% formaldehyde solution and 400 parts of water.

After application by spraying (18 g/square foot) the leather is dried for 2 minutes at about 50°C, until the water has evaporated stacked overnight and given a final ironing at about 80°C and about 160 atmospheres gauge. The resulting leather is distinguished by excellent dry and wet fastness properties and fastness to creasing and light, and also by a soft, supple handle and good grain structure.

The polyurethane dispersion I employed above is obtained as follows: 150 parts (0.086 mol) of a phthalic acid/adipic acid ethylene glycol polyester, 150 parts (0.081 mol) of a phthalic acid ethylene glycol polyester, 18.8 parts (0.14 mol) of α,α'-dimethylolbutyric acid and 30 parts by volume of glycol monomethyl ether acetate are heated to about 80°C. The mixture is treated with 76 parts of 1,6-hexanediisocyanate and subsequently warmed to about 85° to 90°C for 45 minutes. The mixture is then heated to about 120°C, 20 parts of urea is added and the whole is heated to about 135°C for 1 hour. After cooling to about 110°C the melt, which is now free of isocyanate groups, is converted into a dispersion by successive dropwise addition of the following: an aqueous solution of 12 parts of dimethylaminoethanonl in 100 parts by volume of water, 350 parts by volume of water and an aqueous solution of 50 parts by volume of 30% formaldehyde solution in about 250 parts by volume of water. A latex having a solids content of 36% and a pH-value of 5.8 is obtained.

An equivalent top finish is obtained if instead of the polyurethane dispersion employed the same amount of one of the polyurethane dispersions II or III described below is used.

Polyurethane Dispersion II:

500 parts of phthalic acid ethylene glycol polyester (molecular weight: 1,350) and 52 parts of urea are mixed with 190.5 parts of 1,6-hexanediisocyanate at about 75°C and heated. An exothermic reaction starts at about 130°C and the temperature rises to 151°C. After the reaction subsides and the mixture is cooled to 120°C, 53.5 parts of citric acid are added. A strong reaction starts immediately, with the mixture assuming a yellow color and foaming up, in the course of which the temperature first drops to 90°C and subsequently again rises to about 120°C. A solution of 29.2 parts of diethanolamine in 80 parts by volume of water added over the course of 3 minutes, 64.5 parts by volume of aqueous formaldehyde solution added over the course of about 4 minutes and about 750 parts by volume of water added over the course of about 15 minutes are successively introduced at 100°C. Subsequently, a further 250 parts by volume of water were added at about 130°C over the course of about 23 minutes. After cooling the reaction mixture, a white, viscous, slightly rheopetic latex is obtained.

Polyurethane dispersion III:

A solution of 31.6 parts of maleic ureide and 14 parts of potassium hydroxide in 144 parts of an aqueous 20% sodium taurine solution are added all at once, at about 80°C. to 304 parts of a prepolymer obtained by heating 200 parts of adipic acid diethylene glycol ester and 254 parts of 1,6-hexamethylenediisocyanate. 60 parts by volume of a 30% aqueous formaldehyde solution are then added over the course of 3 minutes, followed by 600 parts by volume of water added over the course of about 8 minutes. A mobile white latex is obtained, which is adjusted to a pH-value of about 4 with 30 parts by volume of 30% aqueous tartaric acid solution.

EXAMPLE 3

A matrix of silicone rubber employed for transfer coating is knife-coated with a mixture of 400 parts of the 10% aqueous casein solution described in Example 1 and 600 parts of the polyurethane dispersion I described in Example 2, such that after evaporation of the water the layer thickness is about 400 $\mu$.

Immediately after the knife-coating, a chrome-tanned split leather is pressed onto the coated matrix, the combination is subsequently dried for about 100 minutes at about 70°C and the coated split leather is removed from the matrix. The leather is subsequently dried for about 3 hours at about 80°C in a drying chamber. The coated split leather is distinguished by a fine fold pattern of the layer of dressing on the leather and showed no cracks even after 50,000 dry and wet folds in a Bally Flexometer. The leather has a pleasant handle; on lasting the leather, the split-like leather structure is no longer visible.

Instead of split leather, a cotton fabric and a polyester fabric, are also applied to the coated matrix. A coated textile material distinguished by very good fastness to creasing is obtained.

A customary top finish is applied to the coating in order to influence the handle, impart color or produce matting. This finish may be applied as a first layer to the matrix.

Very resistant coatings are obtained by first spray-coating the matrix with a mixture of 150 parts of a 10% aqueous solution of a casein which has been solubilized with acetic acid 270 parts of the 30% emulsifier-free methylolated cationic polyurethane dispersion I described below and 580 parts of water. The coated matrix is dried, followed by knife-coating the anionic mixture, described in the first part of this example, onto this cationic layer and applying the substrate to be coated onto this anionic layer. The adhesion of the cationic and anionic layers to one another is excellent. As a result of the application of the cationic finish layer, the application of a top finish to the anionic layer is superfluous.

The cationic polyurethane dispersion I employed is prepared as follows: Starting Materials: 500 parts of phthalic acid/adipic acid ethylene glycol polyester (1:1:2.3; average molecular weight 1,650), 50 parts of N-methyl-diethanolamine, 52 parts of urea, 194.5 parts of 1,6-hexanediisocyanate, 19.6 parts of chloroacetamide, 12.6 parts of acetic acid, 129 parts by volume of 30% aqueous formaldehyde solution, 30 parts by volume of glycol monomethyl ether-acetate and 1,400 parts by volume of water.

Procedure: The hexanediisocyanate is introduced over the course of about one hour into a mixture of the polyester, N-methyldiethanolamine and urea, at about 60°C. The temperature of the mixture rises to 112°. After heating to 120°C the temperature rises further to 132°C. Chloroacetamide is then added and rinsed down with glycol monomethyl ether acetate. The reaction mixture is heated to about 130°C for about 10 minutes and then cooled to about 100°C., and the water and acetic acid are then added dropwise over the course of about 45 minutes while maintaining a temperature of from 100° to 110°C. An opaque 32% strength sol was obtained having a pH-value of about 5.

Equal success is achieved by using one of the polyurethane dispersions II, III or IV described below in place of the cationic polyurethane dispersion I described above.

Polyurethane Dispersion II:

Starting Materials: 500 parts of phthalic acid ethylene glycol polyester (average molecular weight 1,350), 30 parts of N-methyl-diethanolamine, 60 parts of urea, 188 parts of 1,6-hexanediisocyanate, 21 parts of chloroacetamide, 1.7 parts of acetic acid, 120 parts by volume of 30% aqueous formaldehyde solution, 680 parts by volume of water and 20 parts by volume of glycol monomethyl ether acetate.

Procedure: The mixture of polyester, N-methyl-diethanolamine and urea is heated to about 85°C and quickly mixed with hexanediisocyanate. The reaction starts after about 2 minutes. Cooling means are used to prevent the temperature from rising to about 150°C. The viscous reaction mass is treated, at about 130°C, with chloroacetamide and subsequently with glycol monomethyl ether acetate. After stirring for a further 30 minutes at about 130°C the solution of the acetic acid in about 80 parts by volume of water is added dropwise, over the course of about 3 minutes, to the highly viscous clear melt in the course of which the melt remains clear. Thereafter the formaldehyde solution is added dropwise at about 90°C over the course of about 20 minutes, followed by the remaining water added at about 130°C over the course of about 50 minutes. A relatively coarsely dispersed thick latex was obtained. (Solids content: 52%; pH value about 5 to 6).

Polyurethane Dispersion III:

Starting Materials: 500 parts of phthalic acid ethylene glycol polyester (molecular weight 1,850), 50 parts of N-methyldiethanolamine, about 52 parts of urea, about 194.5 parts of 1,6-hexanediisocyanate, 25 parts of acetic acid, 129 parts by volume of 30% aqueous formaldehyde solution and 1,500 parts by volume of water.

The reaction of the components takes place as described for the manufacture of the cationic polyurethane dispersion I, with the sole difference that in this mixture the addition of monochloroacetamide and glycol monomethyl ether acetate is omitted.

Polyurethane Dispersion IV:

1,000 parts of an adipic acid hexanediol/neopentylglycol polyglycol ester (average molecular weight 1,740) are reacted with 201 parts of 1,6-hexanediisocyanate for about 1 hour at 130°C. and 107 parts of dimethylaminoethanol are subsequently added at about 80°C. When the strongly exothermic reaction subsides, the mixture is warmed to 130°C after about 30 minutes. A light viscous polyurethane resin having an average molecular weight of about 2,200 and containing terminal tertiary amino groups is obtained. 218 parts of this resin are heated with 20.6 parts of monochloroacetamide to 120°C for about 1 hour, whereby a polyurethane resin with quaternary ammonium groups and terminal carbonamide groups is produced. This is treated, at about 100°C firstly with 30 parts by volume of water, then with 80 parts by volume of a 30% aqueous formaldehyde solution and finally with 300 parts by volume of water. A 42% strength latex was obtained. The examples thus demonstrate that between 218 and 887 parts of water dispersible polyurethane and between 18 and 300 parts of formaldehyde per 100 parts by weight of solubilized casein (solid material) are suitable for the production of coating compositions of the present invention. The examples in which an anionic polyurethane dispersion is used in preparing the coating composition (Examples 1, 2 and page 13 lines 10 to 28 of Example 3) demonstrate a range of 218 to 624 parts of water dispersible polyurethane and 18 to 300 parts of formaldehyde per 100 parts of solubilized casein (solid material).

Although the invention is described in considerable detail in the foregoing examples, it is to be understood that such examples are presented solely for purposes of illustrating the best mode of practicing the invention and it is to be understood that many variations may be made by those skilled in the art without departing from the spirit and scope of the invention.

What is claimed is:

1. A coating composition comprising the reaction product of (a) solubilized casein (b) water-dispersible polyurethane and (c) formaldehyde, in such proportions that from about 10 to about 1,000 parts by weight of (b) and from about 1 to about 60 parts by weight of (c) are present per 100 parts by weight of solid material (a) wherein the reactants are reacted at temperatures between 40° and 140°C.

2. The composition of claim 1 wherein component (a) is a base treated casein and component (b) is selected from the group consisting of non-ionically emulsified, anionic or anionically emulsified polyurethanes.

3. The composition of claim 1 wherein component (a) is reacted with the reaction product of components (b) and (c).

4. The composition of claim 1 wherein component (b) is present in an amount of about 20 to about 700 parts by weight.

5. The composition of claim 1 wherein component (b) is present in an amount of about 50 to about 600 parts by weight.

6. A process for coating leather or textile materials comprising applying an aqueous dispersion of the reactants of claim 1 to a suitable substrate at room temperature and heating the coated substrate to a temperature of from about 40° to about 140°C.

7. A coated textile material prepared by the process of claim 6.

8. A coated leather material prepared by the process of claim 6.

9. A coating composition comprising the reaction product of (a) solubilized casein (b) water dispersible polyurethane and (c) formaldehyde, in such proportions that from 218 to 887 parts by weight of (b) and from 18 to 300 parts by weight of (c) are present per 100 parts by weight of solid material (a) wherein the reactants are reacted at temperatures between 40° and 140°C.

10. A coating composition comprising the reaction production of (a) solubilized casein (b) water-dispersible polyurethane and (c) formaldehyde, in such proportions that from 218 to 624 parts by weight of (b) and from 18 to 300 parts by weight of (c) are present per 100 parts by weight of solid material (a) wherein the reactants are reacted at temperatures between 40° and 140°C.

* * * * *